June 24, 1969            B. BRUNEAU            3,451,728
TRACK AND DRIVE ASSEMBLY FOR TRACK-LAYING VEHICLES
Filed Dec. 27, 1966            Sheet 1 of 2
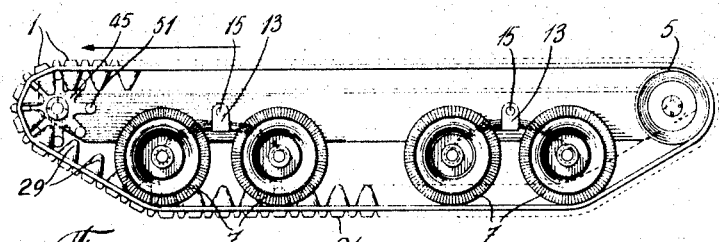
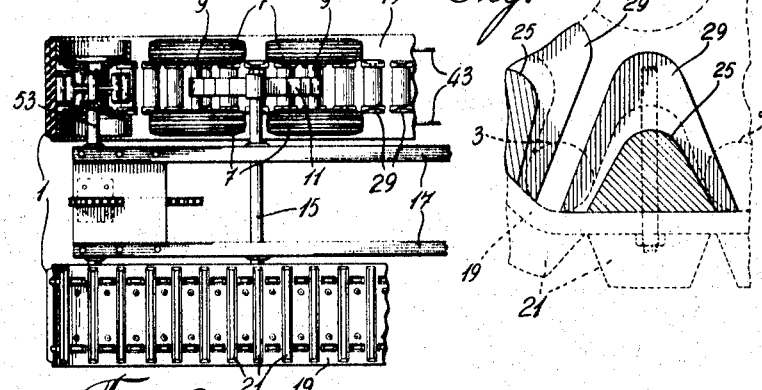
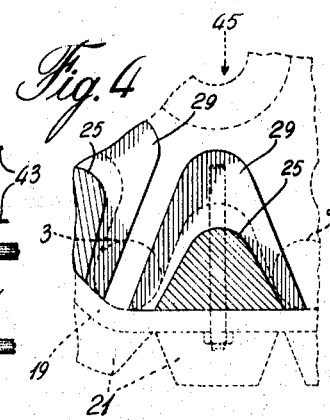
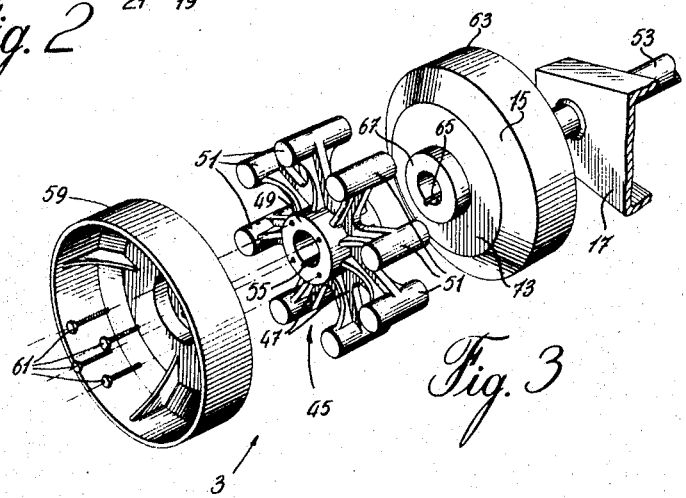
INVENTOR
Bertrand BRUNEAU
BY
ATTORNEY

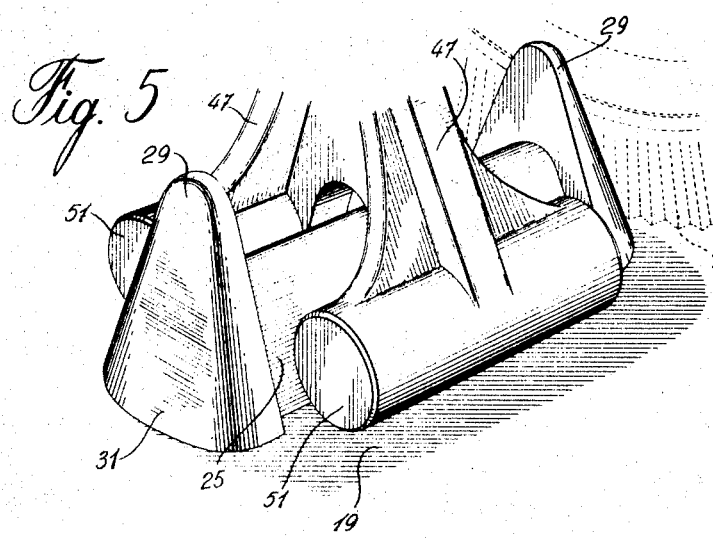
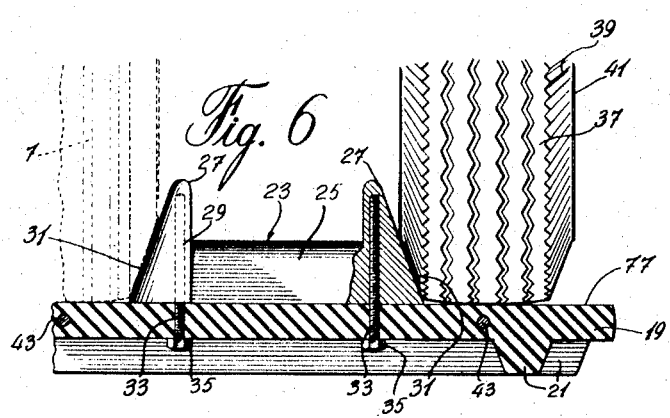
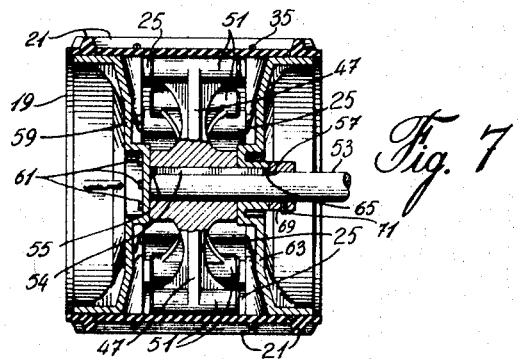

United States Patent Office 3,451,728
Patented June 24, 1969

3,451,728
TRACK AND DRIVE ASSEMBLY FOR TRACK-LAYING VEHICLES
Bertrand Bruneau, Sherbrooke, Quebec, Canada, assignor to Cady Industries Limited, St. George, Beauce, Quebec, Canada
Filed Dec. 27, 1966, Ser. No. 604,897
Int. Cl. B60s 1/62; B62d 25/16, 55/08
U.S. Cl. 305—13     5 Claims

ABSTRACT OF THE DISCLOSURE

A traction drive assembly for a track-laying vehicle having an endless belt provided with spaced transverse teeth and riding lands along the row of teeth for the travel of the pneumatic tires of the vehicle. To prevent untracking, the teeth have lateral ears projecting away from the belt a height greater than the thickness of the tread of the tires and smaller than the distance between the belt and the wheel axle. The teeth successively engage between the contact elements formed at the ends of the spokes of a driving wheel.

---

The present invention generally relates to an endless track and to a drive assembly for use on a track-laying vehicles.

The endless track and drive of the invention is of the known type comprising a generally flat endless belt formed on the outer surface with a layer of ground-gripping tread and on the inner surface with spaced transverse teeth engageable in corresponding grooves formed around the periphery of a drive pulley. In some cases, the teeth are provided transversely centrally of the belt with lands defined on either sides thereof over which ride idling bogey wheels which serve as undercarriage for supporting the vehicle body. The intended purpose of such teeth, apart from causing displacement of the vehicle when the drive pulleys are energized, is to retain the teeth between the pair or pairs of bogey wheels in any movement of the vehicle.

However, it has been found in practice that serious untracking problems are encountered when the vehicle turns corners or when the tracks travel on the side of a hill or over rough and uneven terrain. In such instances, the idling tires of the body-supporting undercarriage jump over the teeth of the tracks which thus slip away, causing the weight of the vehicle to rest solely on the tires which no longer ride over the tracks. Such a difficulty also arises when the vehicle rides over paved roads.

Furthermore, on soft ground, the grooves of the drive pulleys easily get clogged with loose earth material or packed with snow causing the track to slip out of the pulleys.

I have been able to overcome this difficulty by providing teeth wherein at least the lateral portions thereof intended to border the inner surfaces of the tires of a pair have a height substantially greater than the tread of the tires and terminating short of the axle connecting the tires of a pair together whereby the said tires will not tend to detrack by jumping over the teeth. Preferably, the said lateral portions are ears projecting up from the track each having an inclined outer surface generally corresponding to the slope of the tire tread sidewalls.

Another feature of the invention is in the use of a novel drive pulley or sprocket formed with radial spokes the ends of which successively engage in the space between teeth to cause displacement of the endless track and consequently of the vehicle. Such a spoked driving wheel is not prone to become clogged or packed with earth or snow as an enclosure is formed between successive spokes when the ends of the spokes engage between the teeth. Any material caught in the space thus defined will readily escape through the center of the drive wheel or through holes provided in the side cheeks of the wheel.

In the appended drawing which illustrates an embodiment of the invention,

FIG. 1 is a side elevation view of the track and drive assembly of the invention;

FIG. 2 is a sectional plan view of the assembly of FIG. 1 with the top strand of one track removed to show the inner structure thereof;

FIG. 3 is an exploded view of the drive assembly;

FIG. 4 is a schematic illustration of the relation between a tooth (shown in full lines) and the corresponding portion of the track and drive wheel (shown in dotted lines);

FIG. 5 is a perspective view of a tooth and a portion of the drive wheel engaging the said tooth;

FIG. 6 is a cross-sectional view of a portion of the tread with one tooth partially shown in cross-section and a pair of idling tires; and FIG. 7 is a cross-sectional view of the drive assembly.

Referring now to the drawing, wherein like reference numerals denote corresponding parts throughout the several views, in FIG. 1, the track 1 of applicant's invention is shown winding around a drive pulley 45 at one end and an idler pulley 5 at the other end; only one pulley being shown in full details as both can be identical. Similarly, only a portion of track 1 has been fully detailed for purposes of illustration.

The embodiment includes four bogey wheel assemblies each formed of two pairs of tires 7 mounted in tandem arrangement on two axles 9, 9' interconnected by means of a leaf spring 11 provided, centrally thereof, with a bracket 13 secured to a transverse connecting rod 15 joining two tire assemblies. The vehicle undercarriage 17 is secured to these rods 15 in known manner.

The track 1 is formed of a flexible belt 19 having an outer surface provided with the usual ground-engaging tread 21 while the inner surface has a plurality of teeth 23 regularly spaced along belt 19 and best illustrated in FIGS. 5 and 6. Preferably, each tooth is formed of a central portion 25, of triangular cross-section with rounded apex, extending transversely across and centrally of belt 19 and, preferably integrally therewith, with an ear 27 on each side thereof having an outer surface inclined away from central portion 25 to define a slope 31 generally equal to the adjacent lateral wall 39 of a tire tread.

Teeth 23 are preferably made separate from belt 19 and secured thereto by means of screws 33 extending nearly the full length of the ears 27 and across belt 19 to be fastened thereto by means of nuts 35. It should be noted here that screws 33 in this embodiment can suitably serve for the reinforcement of the upper portions of the ears.

Teeth 23 should be preferably be made of wood which is sufficiently resistant while being cheap to manufacture whereas the belt 19 should be made of any conventional track material, that is, usually rubber reinforced with fabric and stress-resisting metal wire such as 43.

The drive assembly of the invention is shown in exploded view in FIG. 3 and will be seen to comprise the driving wheel proper 45 which is somewhat like a geneva wheel in that it comprises a plurality of radial spokes 47 emerging from a central hub 49 and provided at the free end thereof with teeth engaging or contacting members 51, preferably in the form of rollers the axes of which are parallel to the axis of the said wheel 45. There should be a wide free space between adjacent spokes 47 and rollers 51 for a purpose to be determined hereinafter.

Wheel 45 is mounted in any known manner on a driving shaft 53 supported at one end of undercarriage 17 and so constructed and arranged as to be brought into rotation in any known manner such as by means of a key 54 receivable in a slot 55 across the hub 49 and a corresponding slot 57 longitudinally of shaft 53.

Wheel 45 is held on shaft 53 against axial displacement by means of a first circular cheek 59 abutting both the ends of shaft 53 and the corresponding end of wheel 45 and being secured to the latter by any known means such as bolts 61. On the other side of wheel 45 is a second circular cheek 63 mounted over shaft 53 and rotatable therewith by means of the aforesaid key 54 receivable in a slot 65 across the hub 67 of the said second cheek plate 63. A ring 69 fixed on shaft 53 against axial displacement by means of a screw 71 (FIG. 7) serves to ensure abutment of cheek 63 against driving wheel 45.

It should be noted that each cheek 59, 63 has a radial surface 73 terminated at the outer periphery thereof with a frusto-conical surface 75. Both these surfaces serve the same purpose as the sidewalls of tires 7 in regard to the outer slope 31 of the aforesaid ears 27 as clearly illustrated in FIG. 7.

FIG. 6 clearly shows that teeth 23 terminate short of the longitudinal edges of belt 19 whereby there is defined between the said longitudinal edges and the ears 27 lands 77 upon which the tires can travel freely. The height of the ears 27 should be sufficient to prevent the jumping of the tire over teeth 23 and consequently the slipping away of the complete track from underneath the tire assemblies 7 as is often the case with present day structures of this nature.

As will readily be understood, when power is applied to shaft 53 to rotate the driving wheels 45, the rollers 51 of the latter engage the central portions 25 of teeth 23 to cause displacement of belts 1 and consequently of the vehicle. The advantage to be derived from the use of the novel driving wheel 45 of the invention lies in that there is no danger of accumulation of loose earth material or snow between consecutive rollers 51 as is the case with the present day drive pulleys provided with grooves at the circumference thereof that can easily become clogged in service causing detracking of the belt assemblies.

As mentioned previously, the total height of teeth 23, or of ears 27 if the teeth have a central portion 25, is greater than the thickness of the tread 39 of the tires and obviously smaller than the distance between the axle 9 and the inner surface of belt 19. This height depends on the diameter of the tires but mostly on the diameter of sprocket 45. Indeed, the presence of hub 49 on the said sprocket is a limiting factor.

In practice, the smallest tire will probably be 10 in. In such case, the sprocket should be 8 in. in diameter and the height of the teeth 23 or ears 27 would be about 3⅛ in. For larger diameter tires, the sprocket will usually not exceed 16 in. requiring teeth or ears having a height not exceeding 6 in.

It may therefore be concluded that the height of the teeth or ears will vary from 3 to 6 in. in most instances.

Similarly, experiment has shown that the slope of surface 31 should be between 26° and 32° from the vertical.

I claim:

1. A traction drive assembly for a track-laying vehicle comprising:
    (a) at least one pair of spaced parallel coaxial idler tires each formed with a thread, and an axle on which said wheels are mounted;
    (b) an endless belt having an imperforated inner surface and an outer surface;
    (c) a plurality of teeth secured to and evenly distributed along said belt and extending transversely across said belt on the inner surface thereof, said teeth terminating short of either of the longitudinal edges of said belt to define therewith riding lands for said parallel tires;
    (d) each tooth formed with a central portion of a predetermined uniform height and an ear at each end thereof bordering said riding lands; said ears projecting upwardly from said belt a height greater than the thickness of said thread and smaller than the distance between said axle and said belt to prevent untracking;
    (e) a driving wheel for said belt formed of a hub and a plurality of evenly spaced spokes projecting radially from said hub, eack spoke having substantially a cylindrical teeth-contact element at the free end thereof, the axis of said element being parallel to the axis of said hub and the said cylindrical element extending axially beyond the said spoke on each side thereof, whereby to cause displacement of said belt by engagement of said contact elements with said teeth as said driving wheel rotates, and wherein
    (f) successive driving wheel spokes define therebetween an opening substantially greater than the cross-sectional dimensions of said teeth secured to said belt whereby to prevent clogging of said driving wheel.

2. A traction drive assembly for a track-laying vehicle comprising:
    (a) at least one pair of spaced parallel coaxial idler tires each formed with a tread having an inner frusto-conical sidewall, and an axle over which said wheels are mounted;
    (b) an endless belt having an imperforated inner surface and an outer surface;
    (c) a pluarlity of teeth secured to and evenly distributed along said belt and extending transversely across said belt on the inner surface thereof, said teeth terminating short of either of the longitudinal edges of said belt to define therewith belt riding lands for said parallel tires;
    (d) each tooth formed with a central portion of a predetermined height and an ear at each end thereof bordering said riding lands;
    (e) said ears having an untracking-preventing surface bordering said riding lands; said surfaces projecting upwardly from said belt a height greater than the thickness of said tread and smaller than the distance between said axle and said belt;
    (f) said untracking-preventing surfaces sloping outwardly in relation to said lands;
    (g) a driving wheel for said belt formed of a hub and a plurality of evenly spaced spokes projecting radially from said hub, each spoke having a substantially cylindrical teeth-contact element at the free end thereof, the axis of said element being parallel to the axis of said hub and the said cylindrical element extending axially beyond the said spoke on each side thereof, whereby to cause displacement of the belt by engagement of said contact elements with said teeth as said driving wheel rotates;
    (h) wherein successive driving wheel spokes define therebetween an opening substantially greater than the cross-sectional dimensions of said teeth secured to said belt whereby to prevent clogging of said driving wheel; and
    (i) a pair of retaining circular cheeks mounted coaxial with and on either sides of said driving wheel; each cheek formed with a central radial surface terminated peripherally with a frusto-conical surface corresponding to said sloping surfaces of said ears.

3. An assembly as claimed in claim 2, wherein said teeth are secured to said belt by means of bolts to serve as reinforcement therefor and through said belt and by means of nuts screwed on both bolts on said outer surfare.

4. A track as claimed in claim 2 wherein said height lies between 3 and 6 in.

5. A track as claimed in claim 2, wherein said sloping surfaces have an angle of 26° to 32° from the vertical.

References Cited

UNITED STATES PATENTS

| | | | |
|---|---|---|---|
| 2,107,490 | 2/1938 | Mayne | 305—38 |
| 2,461,849 | 2/1949 | Slemmons | 305—38 |
| 1,814,046 | 7/1931 | Kegresse. | |
| 2,064,890 | 12/1936 | Dorst. | |
| 2,223,490 | 12/1940 | Landry. | |
| 2,338,818 | 1/1944 | Mayne | 305—81 X |
| 2,998,998 | 9/1961 | Hyler. | |
| 3,118,709 | 1/1964 | Case | 305—37 |

FOREIGN PATENTS 709,659  5/1931  France.

RICHARD J. JOHNSON, *Primary Examiner.*

U.S. Cl. X.R.

305—35